US006877037B1

(12) United States Patent
Adachi

(10) Patent No.: US 6,877,037 B1
(45) Date of Patent: Apr. 5, 2005

(54) METHOD OF UPDATING CLIENT'S INSTALLED DATA IN RESPONSE TO A USER-TRIGGERED EVENT

(75) Inventor: Tetsuji Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 596 days.

(21) Appl. No.: 09/656,959

(22) Filed: Sep. 7, 2000

(30) Foreign Application Priority Data

Sep. 9, 1999 (JP) ............................................ 11-255390

(51) Int. Cl.⁷ ............................................... G06F 15/16
(52) U.S. Cl. ...................... 709/227; 709/221; 709/222; 709/220; 709/203; 717/177; 707/203
(58) Field of Search ........................ 709/227, 220–221, 709/222, 237; 717/177; 707/203; 455/418; 715/511

(56) References Cited

U.S. PATENT DOCUMENTS

| 5,734,898 | A | * | 3/1998 | He ............................. 707/203 |
| 5,862,348 | A | * | 1/1999 | Pedersen .................... 709/229 |
| 5,864,837 | A | * | 1/1999 | Maimone ...................... 707/1 |
| 5,960,340 | A | * | 9/1999 | Fuentes ...................... 455/417 |
| 6,073,140 | A | * | 6/2000 | Morgan et al. ............. 707/203 |
| 6,308,061 | B1 | * | 10/2001 | Criss et al. ................ 455/418 |
| 6,377,570 | B1 | * | 4/2002 | Vaziri et al. ............... 370/352 |
| 6,466,796 | B1 | * | 10/2002 | Jacobson et al. ........ 455/456.3 |
| 6,487,407 | B2 | * | 11/2002 | Goldberg et al. ........... 455/433 |

FOREIGN PATENT DOCUMENTS

| JP | 1-245346 | 9/1989 |
| JP | 2-159162 | 6/1990 |
| JP | 6-51992 | 2/1994 |
| JP | 7-334436 | 12/1995 |
| JP | 10-21058 | 1/1998 |
| JP | 11-7391 | 1/1999 |
| WO | WO 97/16938 | 5/1997 |

\* cited by examiner

*Primary Examiner*—Ario Etienne
*Assistant Examiner*—Abdullahi E. Salad
(74) *Attorney, Agent, or Firm*—Young & Thompson

(57) ABSTRACT

A client terminal, such as mobile terminal, stores a version number of its installed data or control program and transmits a request message to the server system via a communication network in response to an event triggered by a user of the client terminal, the request message containing the version number of the data and a phone number of the client terminal. The server system stores most recent data and a version number of the most recent data. When the server system receives the transmitted request, it compares the version number contained in the received request to the stored version number and transmits a copy of the most recent data and the version number of the most recent data to the client terminal via the communication network if there is a mismatch between the compared version numbers. The client terminal receives the copy of the most recent data and the version number from the server system and updates the installed data with the received copy and updates the stored version number with the received version number.

8 Claims, 12 Drawing Sheets

MOBILE TERMINAL

HOME LOCATION REGISTER

HOME LOCATION REGISTER

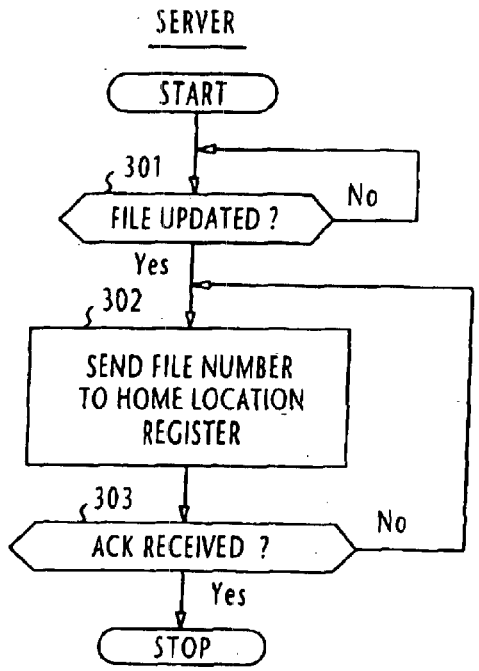
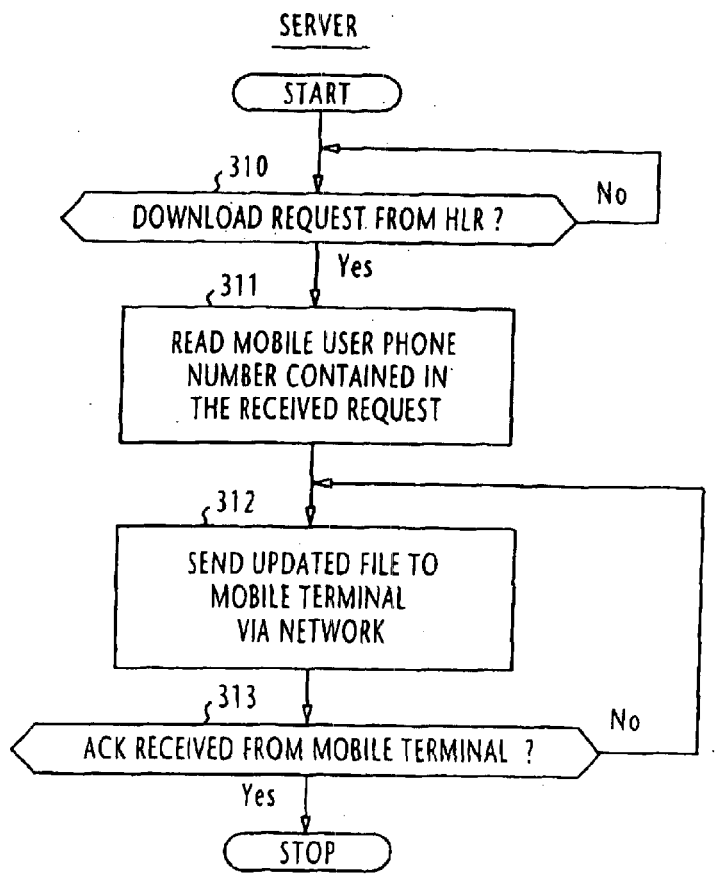

HOME LOCATION REGISTER

HOME LOCATION REGISTER

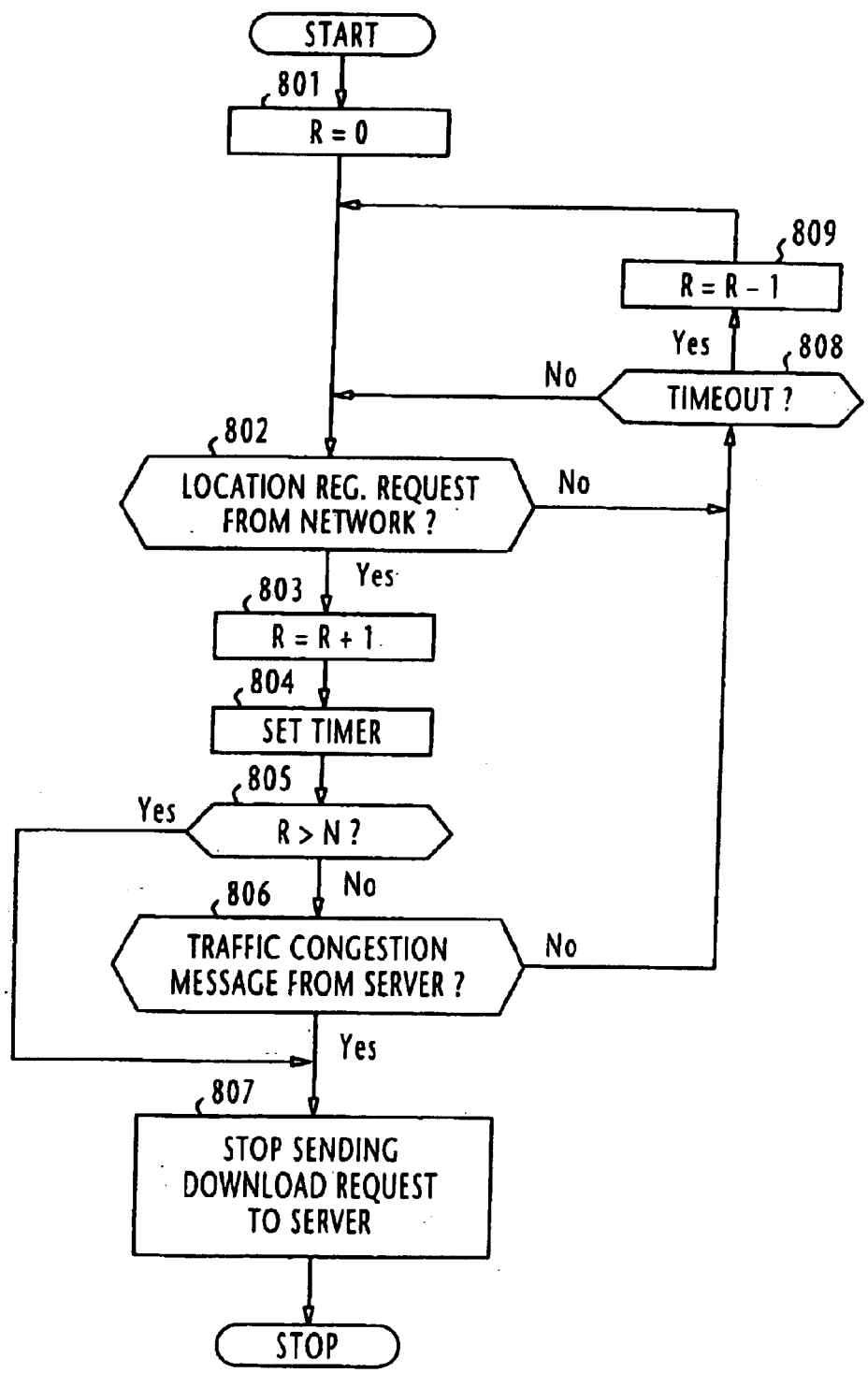

METHOD OF UPDATING CLIENT'S INSTALLED DATA IN RESPONSE TO A USER-TRIGGERED EVENT

BACKGROUND OF THE INVENTION

1. Field of the Invention

The present invention relates to a method of updating data such as control programs, files and data modules.

2. Description of the Related Art

Recent advances in mobile communications and integrated circuit technologies have made possible the proliferation of low-cost, small mobile (client) terminals that are easy to communicate with an increasing number of communication terminals and systems through the mobile communication network or the Internet. An increasing number of software packages (such control programs, associated file data, and data modules) have been developed for installation on mobile terminals in order to meet new customer services. However, whenever users desire a new service feature, the assistance of trained personnel is required to update their software packages.

Transmission of software data can be done in one of two known methods. In the first method, called "pull technologies", users take the initiative for retrieving data from sources such as World Wide Web. The second method, called "push technologies", is one that is initiated by news servers on the internet which take the initiative to distribute news to users on a broadcast mode. These known methods may be used for updating software installed on user terminals.

However, the pull technologies inherently require the initiative on the client side, while the updating of software itself must be initiated from the source where the software was created or modified. The push technologies, on the other hand, require that file transfer be performed on a broadcast mode. However, the burden of the network will increase significantly if it were to carry traffic to a large number of user terminals.

SUMMARY OF THE INVENTION

It is therefore an object of the present invention to provide an efficient method of updating data installed on a client (mobile) terminal when a user-triggered event occurs on the user's terminal.

According to a first aspect of the present invention, there is provided a method of updating data installed on a client terminal from a server system via a communication network. According to the present invention, the client terminal, such as mobile terminal stores a version number of the installed data and transmits a request message to the server system via the communication network in response to an event triggered by a user of the client terminal, the request message containing the version number of the data and a phone number of the client terminal. The server system stores most recent data and a version number of the most recent data. When the server system receives the transmitted request, it compares the version number contained in the received request to the stored version number and transmits a copy of the most recent data and the version number of the most recent data to the client terminal via the communication network if there is a mismatch between the compared version numbers. The client terminal receives the copy of the most recent data and the version number from the server system and updates the installed, data with the received copy and updates the stored version number with the received version number.

According to a second aspect of the present invention, the client terminal transmits a request message to a server system via a communication network in response to an event triggered by a user of the client terminal, the request message containing a phone number of the client terminal. The server system stores most recent data and further stores a version number of the most recent data in a first memory and maps a plurality of version numbers of the data to a plurality of phone numbers in a second memory. The server system, on receiving the request transmitted from the client terminal, compares a version number mapped in the second memory corresponding to the phone number contained in the received request to the version number of the most recent data stored in the first memory. If there is a mismatch between the compared version numbers, the server system transmits a copy of the most recent data to the client terminal via the communication network and updates the corresponding mapped version number in the second memory with the version number of the first memory. The client terminal receives the copy of the most recent data from the server system and updates the installed data with the received copy.

BRIEF DESCRIPTION OF THE DRAWINGS

The present invention will be described in further detail with reference to the accompanying drawings, in which:

FIGS. 7A and 7B are flowcharts for operating the server according to the first embodiment of the present invention;

FIG. 15 is a flowchart for operating the home location register for controlling the network traffic when the network is likely to be overloaded with updating file transfer.

DETAILED DESCRIPTION

Figure 1:
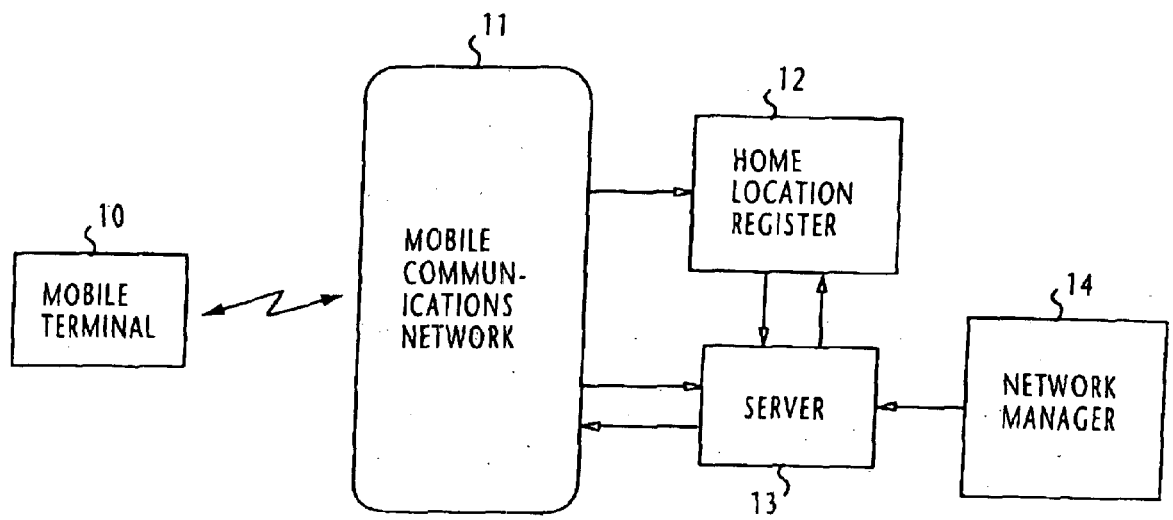
FIG. 1 is a block diagram of a mobile communication network according to the present invention for updating mobile's file data through a communication network.

Referring now to FIG. 1, there is shown a mobile communication system according to the present invention as one example of client-server systems. The system includes a mobile communications network 11, a home location register 12, a server 13 and a network manager 14. Mobile communication network 11 is made up of a large number of wireless base stations each providing a coverage of a cell to serve a mobile terminal 10. When the mobile terminal 10 enters one of the cells or remains in one cell, a location registration request is sent from the mobile terminal to the network. Home location register 12 is connected to the network to receive the location registration request and provides mapping of the mobile's address number to the address number of the current base station.

Figure 2:
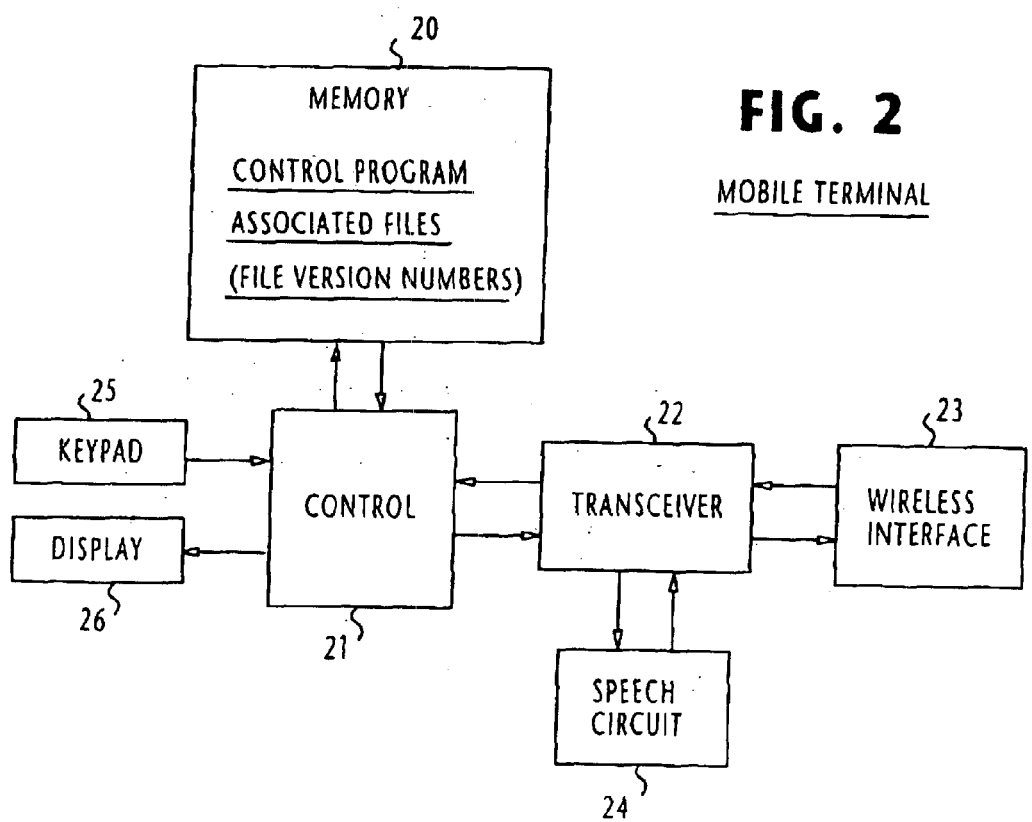
FIG. 2 is a block diagram of the mobile terminal of FIG. 1.

As shown in FIG. 2, the mobile terminal includes a memory 20 such as flash memory or a random-access memory for storage of a control program, associated files and software version numbers. A control unit (CPU) 21 is connected to the memory 20 to perform signal processing according to the control program of the memory 20. Mobile terminal 10 is connected to a transceiver 22 to transmit and receive control signals to and from the network via a wireless interface 23. A speech circuit 24 is connected to the transceiver 22 and further to the mobile terminal 10 to establish and maintain speech communication. A keypad 25 and a display circuit 26 are also connected to the mobile terminal 10. Mobile terminal 10 has the functions of sending a location registration request at the time the mobile terminal is powered on or a call is initiated or terminated.

Figure 3:
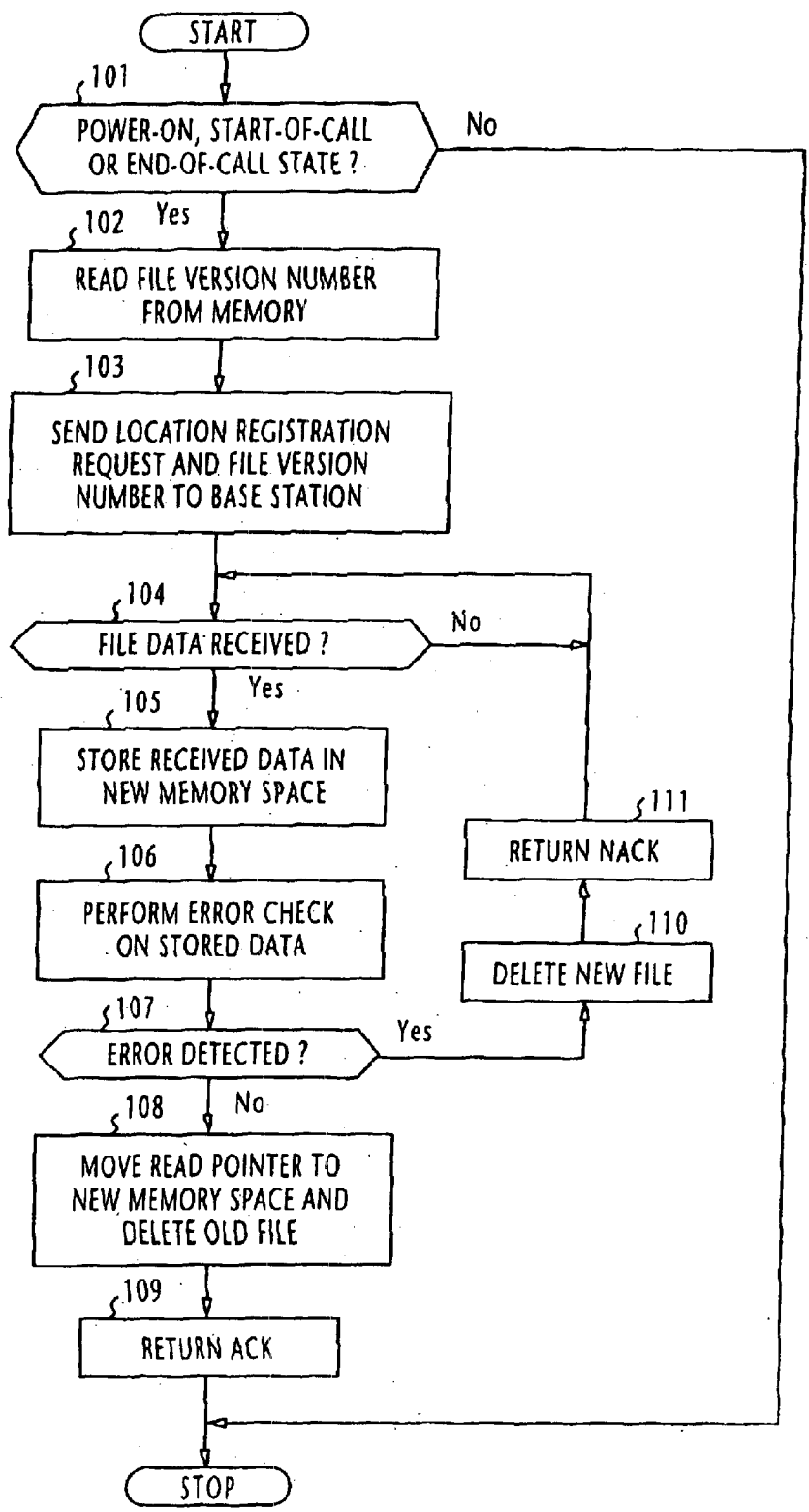
FIG. 3 is a flowchart for operating the mobile terminal according to a first embodiment of the present invention.

The operation of the mobile terminal 10 proceeds according to the flowchart of FIG. 3.

When the mobile the is briefly in a state that occurs in response to the power switch being turned on, a call-origination or a call-termination key is operated on the keypad (block 101), the mobile terminal 10 reads the version number of a specified file from the memory 20 (block 102). Mobile terminal 10 transmits a location registration request containing the retrieved version number and the mobile's phone number to the network via the base station of the local cell (block 103).

Mobile terminal 10 now enters a waiting state for a response from the network. As will be described, the transmitted signal is passed though the mobile communication network 11 to the home location register 12 where the version number of the specified file is compared to its most recent version number. If they mismatch, the home location register 12 sends a download request to the server 13, which begins a file transfer to download the file data of the most recent version to the mobile terminal 10 through the network 11.

When the mobile terminal starts receiving the transmitted file data (block 104), the mobile terminal 10 proceeds to block 105 to store the received data in a new memory space reserved in the memory 20 and performs an error check on the received file data (block 106). If no error is detected (block 107), the mobile terminal 10 moves the read pointer to the new memory space and deletes the old file from the memory 20 (block 108) and returns a positive acknowledgment message to the server 13 via the network 11 (block 110). If an error is detected (block 107), flow proceeds to block 110 to delete the new file data and sends back a negative acknowledgment message to the server 13 (block 111) and returns to decision block 104 for receiving a retransmitted file, and repeating an error check process on the retransmitted file data.

Figure 4:
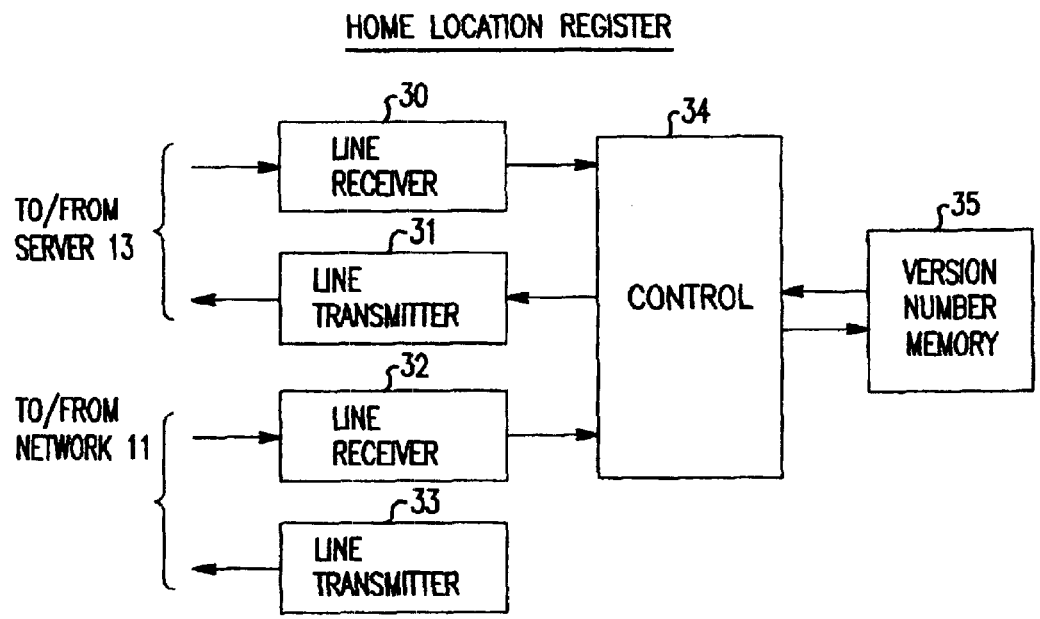
FIG. 4 is a block diagram of the home location register of FIG. 1.

As shown in FIG. 4, the home location register 12 is connected to the server 13 via a line receiver 30 and a line transmitter 31 and connected to the network 11 via a line receiver 32 and a line transmitter 33. A controller 34 is connected to the line receiver 30 to receive a new version number of the specified file from the server 13 and updates the old version number of the specified file stored in a most recent version number memory 35 with the received file number and then returns an acknowledgment message to the server 13 via the line transmitter 31. Controller 34 is also connected to the line receiver 32 to receive location registration requests and accompanying version numbers of specified files from the network 11. In response to a location registration request from the network, the home location register 12 compares the version number of a file contained in the request with the most recent version of the file stored in the memory 35 to determine if they match or mismatch. If they mismatch, the home location register 12 sends a download request to the server 13.

Figure 5:
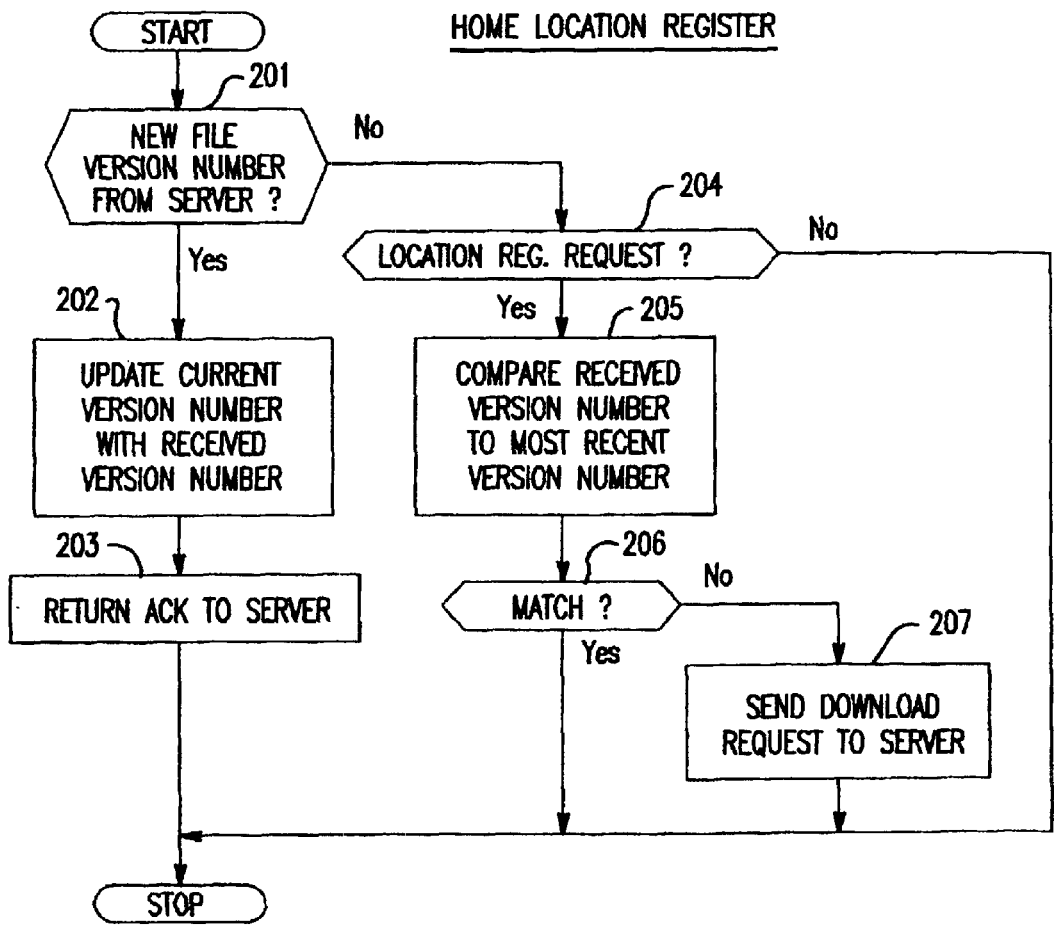
FIG. 5 is a flowchart for operating the home location register according to the first embodiment of the present invention.

FIG. 5 is the flowchart of the operation of the home location register 12. Home location register 12 monitors the outputs of the line receivers 30 and 32 to check to see if a new file number is received from the server 13 (block 201) or a location registration request is received from the network (block 204). When the home location register 12 receives a new version number of a specified file from the server 13, the home location register 12 proceeds from block 201 to block 202 to update the old version number of the specified file stored in the memory 35 with the received new version number and returns an acknowledgment message to the server 13 (block 203). When the home location register 12 receives a location registration request from the network 11, its controller proceeds from block 204 to block 205 to compare the version number of a file contained in the location registration request to the most recent version number of the file stored in the memory 35. If they match (block 206), the routine is terminated. If they mismatch, the home location register 12 determines that the version number of the requesting mobile terminal is older than its most recent version number, and proceeds from block 206 to block 207 to send a download request to the server 13 via the line transmitter 31. This download request contains the telephone number of the requesting mobile terminal.

Figure 6:
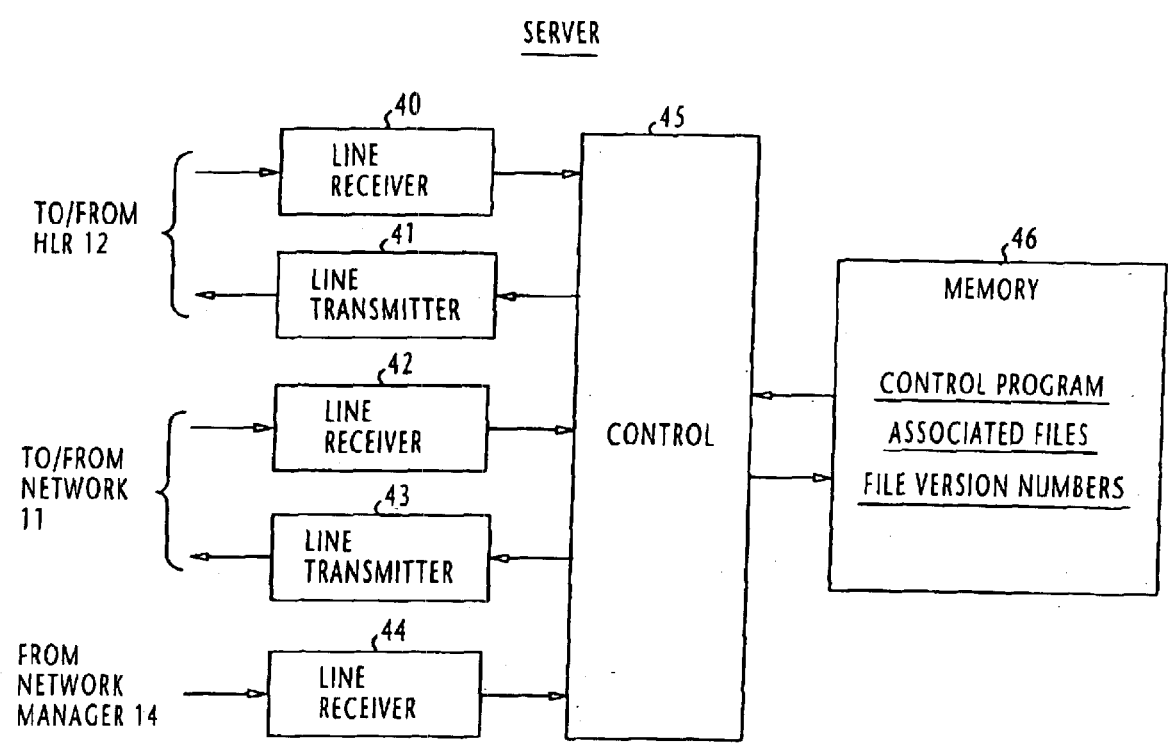
FIG. 6 is a block diagram of the server of FIG. 1.

In FIG. 6, the server 13 includes a controller 45 which is connected to the home location register 12 via a line receiver 40 and a line transmitter 41 and further connected to the network 11 via a line receiver 42 and a line transmitter 43. Additionally, a line receiver 44 is provided to interface the controller 45 to the network manager 14. A memory 46 holds the most recent program for operating mobile terminals, associated files and file version numbers. Controller 45 updates the contents of the memory 45 with data downloaded from the network manager 14.

According to the flowchart shown in FIG. 7A, a file update routine of the server 13 starts with block 301 where the server 13 checks to see if any of the stored files in the memory 46 has been updated with a new file downloaded from the network manager 14. If this is the case, the server 13 reads the version number of the updated file from the memory 45 and sends it to the home location register 12 (block 302) and waits for an acknowledgment message from the home location register. If an acknowledgment message is not received within a specified period of time from the home location register (block 303), the server 13 returns to block 302 to retransmit the version number of the new file. If an acknowledgment message is received within the specified time period (block 303), the server terminates the routine.

In FIG. 7B, the server 13 begins a download routine in response to a download request message sent from the home location register 12 (block 310) by reading the mobile's telephone number contained in the received message (block 311). Server 13 begins a file transfer in block 312 by transmitting the updated most recent file data to the requesting mobile terminal via the communications network 11. When the file transfer is completed, the server 13 waits for a positive or a negative acknowledgment message from the mobile terminal (block 313). If a negative acknowledgment message is received, the server 13 returns to block 312 to repeat the file transfer until it receives a positive acknowledgment message from the mobile terminal.

Figure 8:
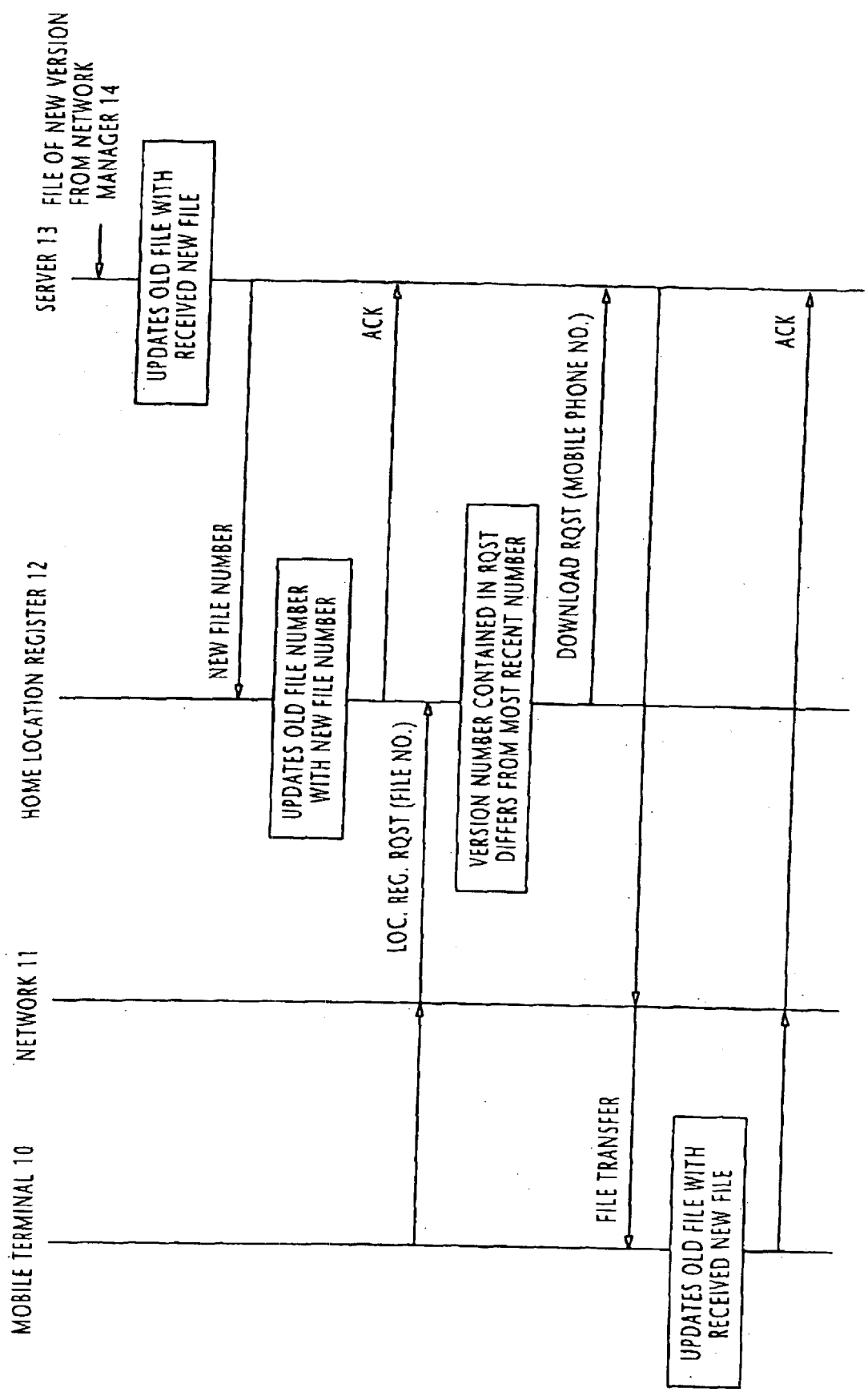
FIG. 8 is a sequence diagram for illustrating the overall operation of the system according to the first embodiment of the present invention.

For a full understanding of the present invention, the overall operation of the client-server system of the first embodiment is shown in the sequence diagram of FIG. 8.

Network manager 14 provides overall control of the client-server system by making improvements to files used in the client terminals at intervals. When improvements have been made of a given file and the version number of the file is updated, the new file data and the new version number are transmitted from the network manager 14 to the server 13 to update the old file data and its version number (see also block 301, FIG. 7A). The new version number is then transmitted from the server 13 to the home location register 12 (block 302, FIG. 7A). If the transmitted new version number is successfully received (block 201, FIG. 5), the home location register 12 updates the old version number of the file stored in the version number memory 35 with the received number (block 202) and returns an acknowledgment message to the server 13 (block 203).

When a mobile terminal 10 sends a location registration request containing the version number of the given file to the network 11 and the home location register 12 receives it through the network 11 (block 204, FIG. 5), the home location register compares the version number contained in the request to the most recent version number of the file stored in the version number memory 35 (block 205). If the version number contained in the location registration request differs from the most recent number (block 206), the home location register sends a download request containing the phone number of the mobile terminal to the server 13 (block 207). In response to the download request, the server 13 sends the file data of the most recent version to the mobile terminal 10 through the network 11 (blocks 310 to 313, FIG. 7B). Mobile terminal 10 updates its old file with the new file sent from the server 13 if no error is detected in the received file, and returns a positive acknowledgment to the server 13 via the network 11.

The present invention allows efficient updating of user's installed data by sending a single location registration request to the network whenever the user triggers an event on the mobile terminal such as power-on state, or an operating state of a start-of-call key and an end-of-call key, even though the user is not intended to do so. The traffic load on the communication network is thus reliably and evenly distributed among mobile terminals.

Figure 9:
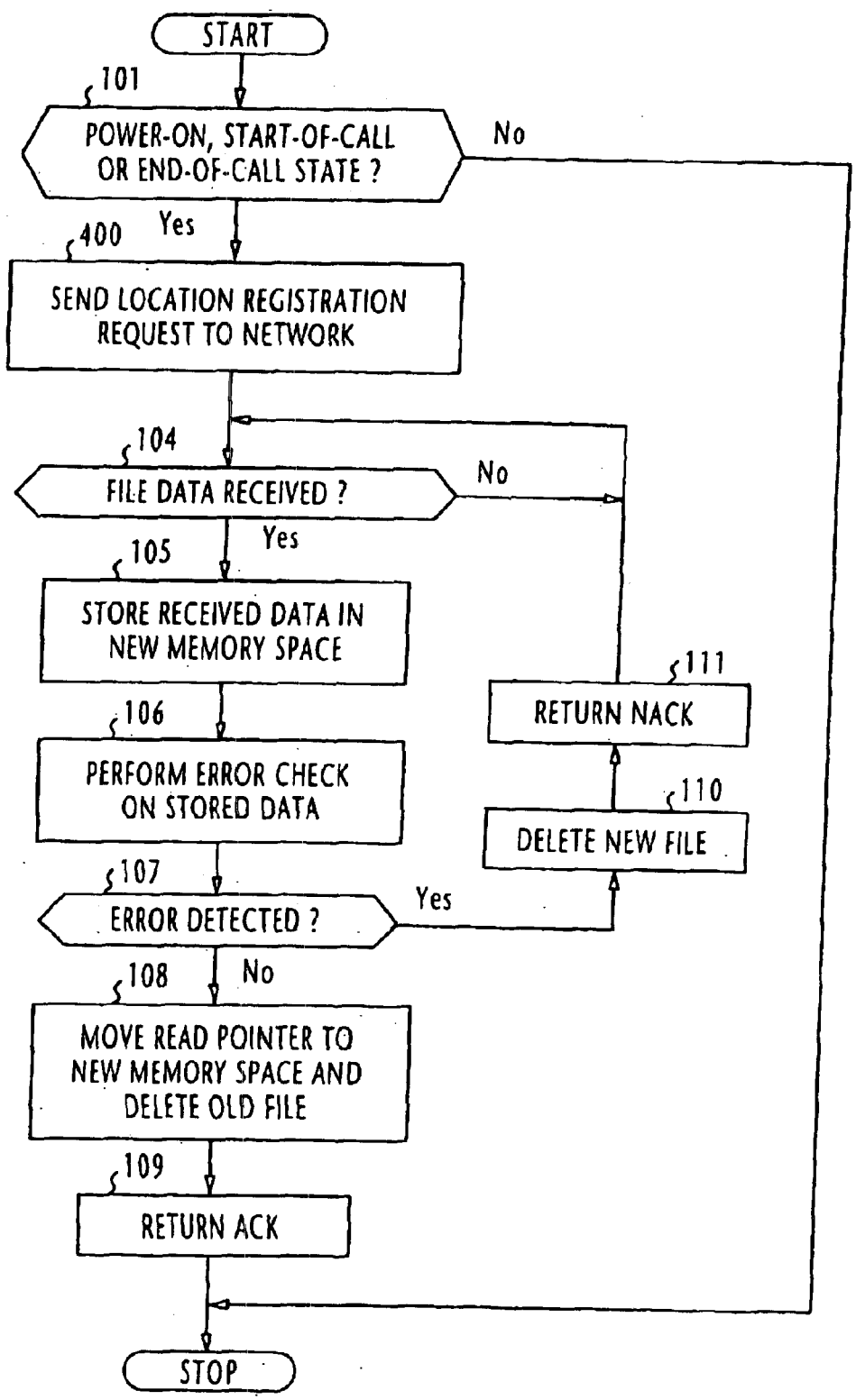
FIG. 9 is a flowchart for operating the mobile terminal according to a second embodiment of the present invention.
Figure 10:
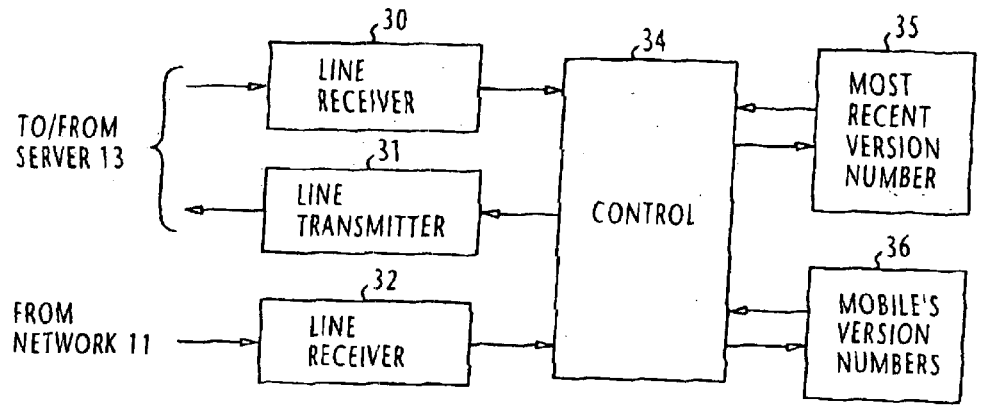
FIG. 10 is a block diagram of the home location register according to the second embodiment of the present invention.

In a second embodiment of the present invention, the mobile terminal, the home location register and the server of the present invention may be modified as shown in FIGS. 9, 10, 11 and 12. As shown in FIG. 10, the home location register 12 of this modification additionally includes a memory 36 in which a plurality of version numbers of a file are mapped to a plurality of mobile's phone numbers, instead of storing the version number of the file in the memory 20 of mobile terminal. In addition, the server 13 operates according to the flowchart of FIG. 7A as in the previous embodiment when a new file is sent from the network manager 14. The second embodiment relieves the burden of each mobile terminal from maintaining the version numbers of installed data by shifting the burden to the home location register 12.

Specifically, the mobile terminal 10 operates according to the flowchart of FIG. 9 in which block 400 is used to replace blocks 102 and 103 (FIG. 3) of the previous embodiment. Since no file version numbers are stored in the mobile terminal, the location registration request is simply sent to the network with no further information as indicated in block 400.

Figure 11:
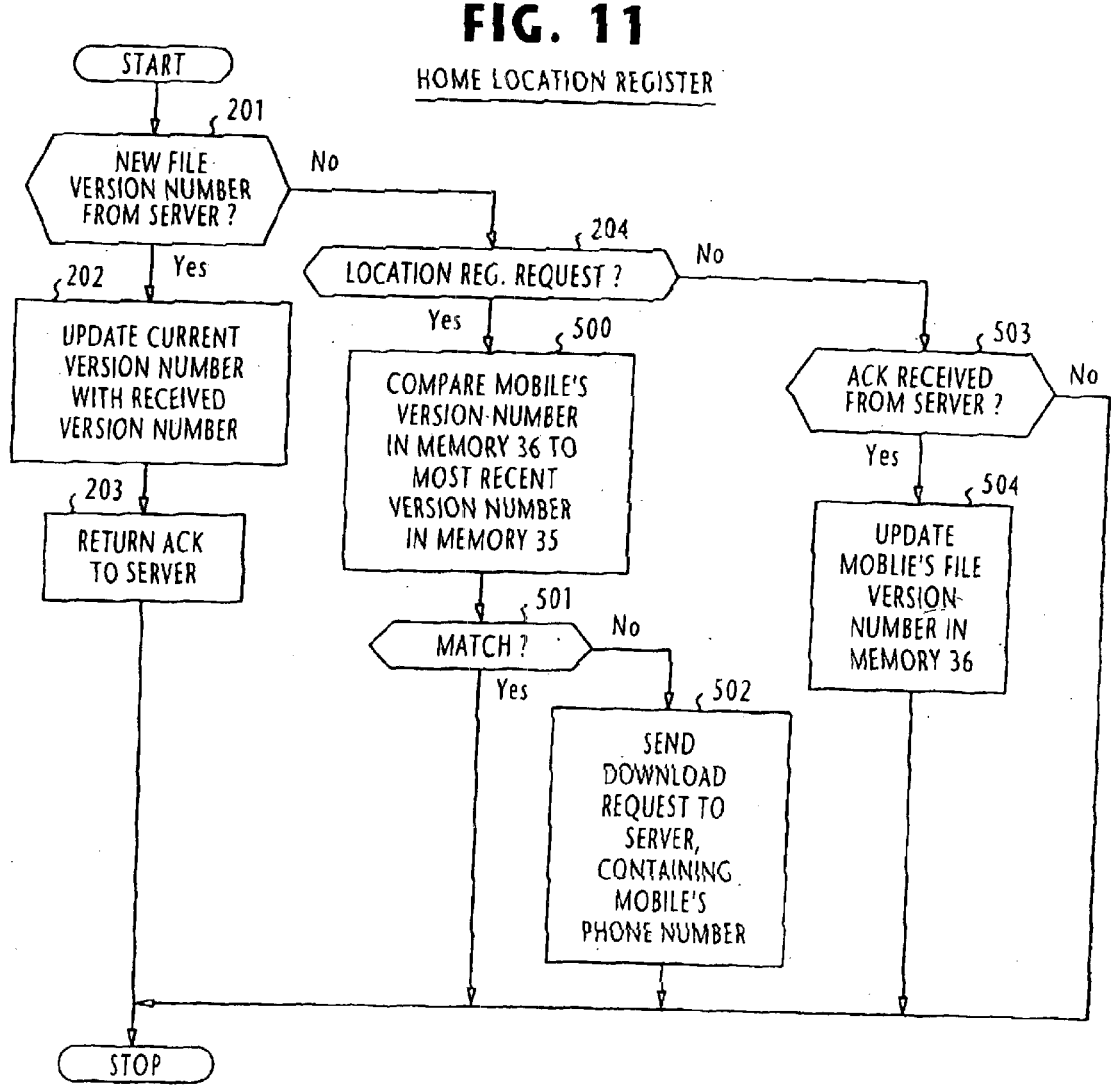
FIG. 11 is a flowchart for operating the home location register according to the second embodiment of the present invention.

Home location register 12 operates according to the flowchart of FIG. 11. Home location register 12 operates in the same way as in the previous embodiment until it receives a location registration request from the mobile terminal (block 204). In response to the location registration request, the home location register 12 compares the file version number of the requesting mobile terminal stored in a location of the memory 36 identified by the mobile's phone number to the most recent file version number stored in the memory 35 (block 500). If they mismatch (block 501), a download request is sent from the home location register to the server 13, containing the mobile's phone number (block 502).

Figure 12:
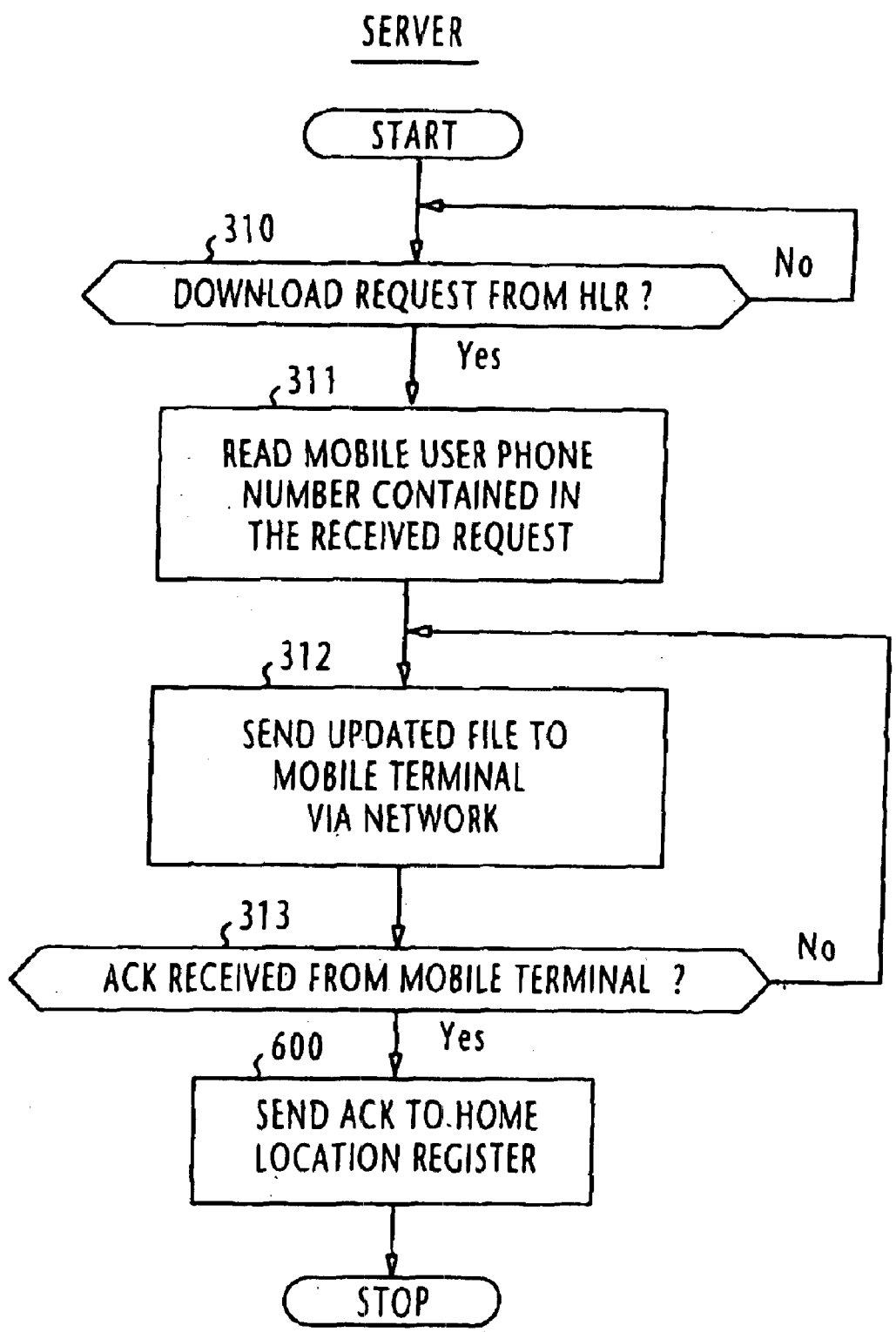
FIG. 12 is a flowchart for operating the server according to the second embodiment of the present invention.

In FIG. 12, the server 13 performs file transfer in the say way as in the flowchart of FIG. 7B in response to the download request from the home location register (blocks 310 to 312) and waits for a positive acknowledgment message from the mobile terminal (block 313). When a positive acknowledgment message is receive from the mobile terminal, the server sends an acknowledgment message to the home location register (block 600), and terminates the routine.

Returning to FIG. 11, the home location register receives an acknowledgment message from the server (block 503). In response to this message, the home location register proceeds to update the mobile's file version number in the memory 36 with the most recent file version number stored in the memory 35, and terminates the routine.

Figure 13:
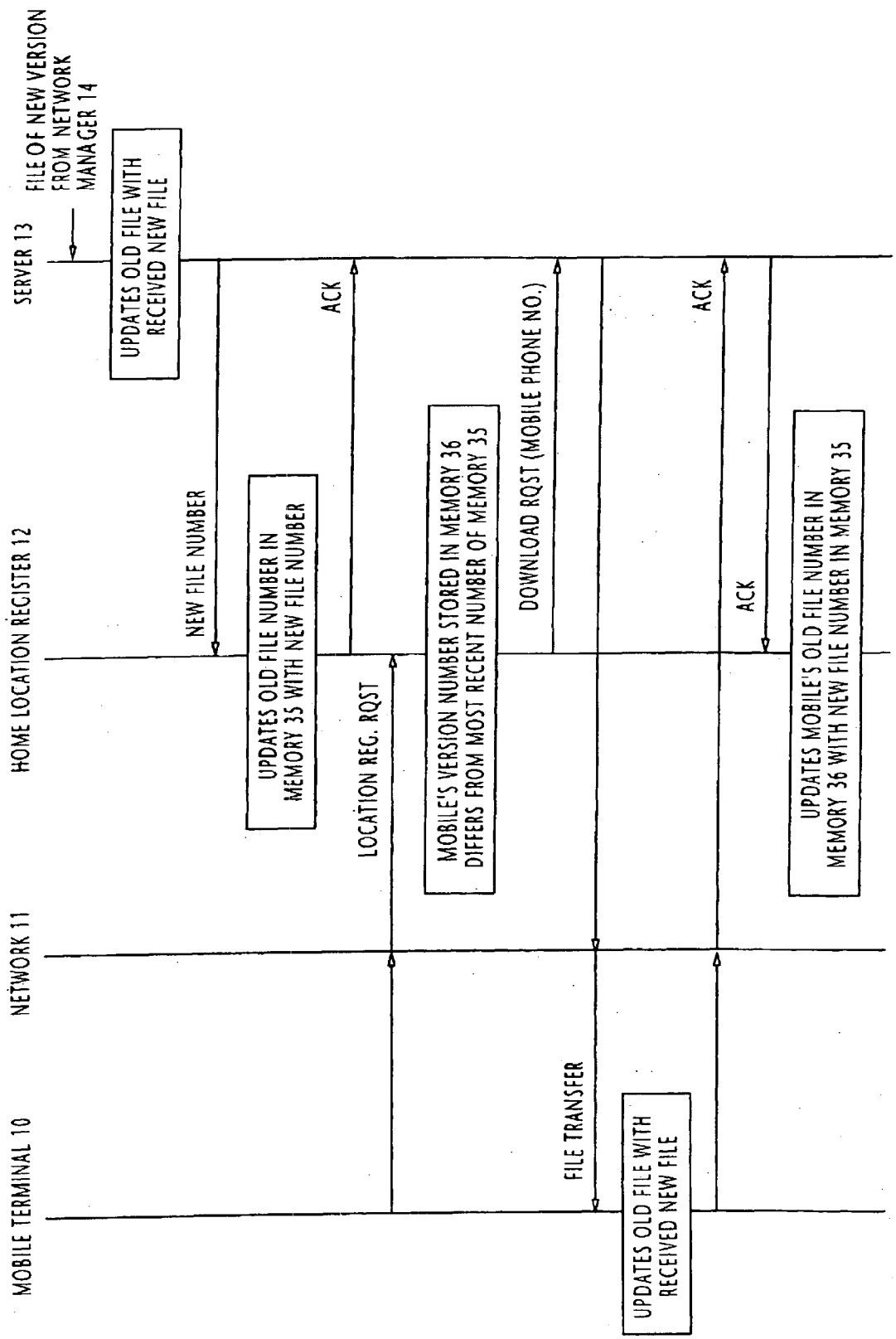
FIG. 13 is a sequence diagram for illustrating the overall operation of the system according to the second embodiment of the present invention.

The overall operation of the client-server system of the second embodiment is shown in the sequence diagram of FIG. 13.

Similar to the first embodiment, when improvements have been made of a given file and the version number of the file is updated, the new file data and the new version number are transmitted from the network manager 14 to the server 13 to update the old file data and its version number (block 301, FIG. 7A). The new version number is then transmitted from the server 13 to the home location register 12 (block 302) if the transmitted new version number is successfully received (block 201, FIG. 11), the home location register 12 updates the old version number of the file stored in the version number memory 35 with the received number (block 202, FIG. 11) and returns an acknowledgment message to the server 13 (block 203, FIG. 11).

When a mobile terminal 10 sends a location registration request to the network 11 and the home location register 12 receives it through the network 11 (block 204, FIG. 11), the home location register compares the mobile's file version number stored in the memory 36 corresponding to the mobile's phone number to the most recent version number of the file stored in the version number memory 35 (block 500, FIG. 11). If the mobile's version number in memory 36 differs from the most recent number in memory 35 (block 501), the home location register sends a download request containing the phone number of the mobile terminal to the server 13 (block 502). In response to the download request, the server 13 sends the file data of the most recent version to the mobile terminal 10 through the network 11 (blocks 310 to 312, FIG. 12). Mobile terminal 10 updates its old file with the new file sent from the server 13 if no error is detected in the received file, and returns a positive acknowledgment message to the server 13 via the network 11. When the server receives the message for the mobile terminal (block 313, FIG. 12), it sends an acknowledgment message back to the home location register (block 600, FIG. 12). In response to this acknowledgment message, the home location register updates the mobile's file version number in memory 36 with the most recent file version number in memory 35 (blocks 503, 504, FIG. 11).

Figure 14:
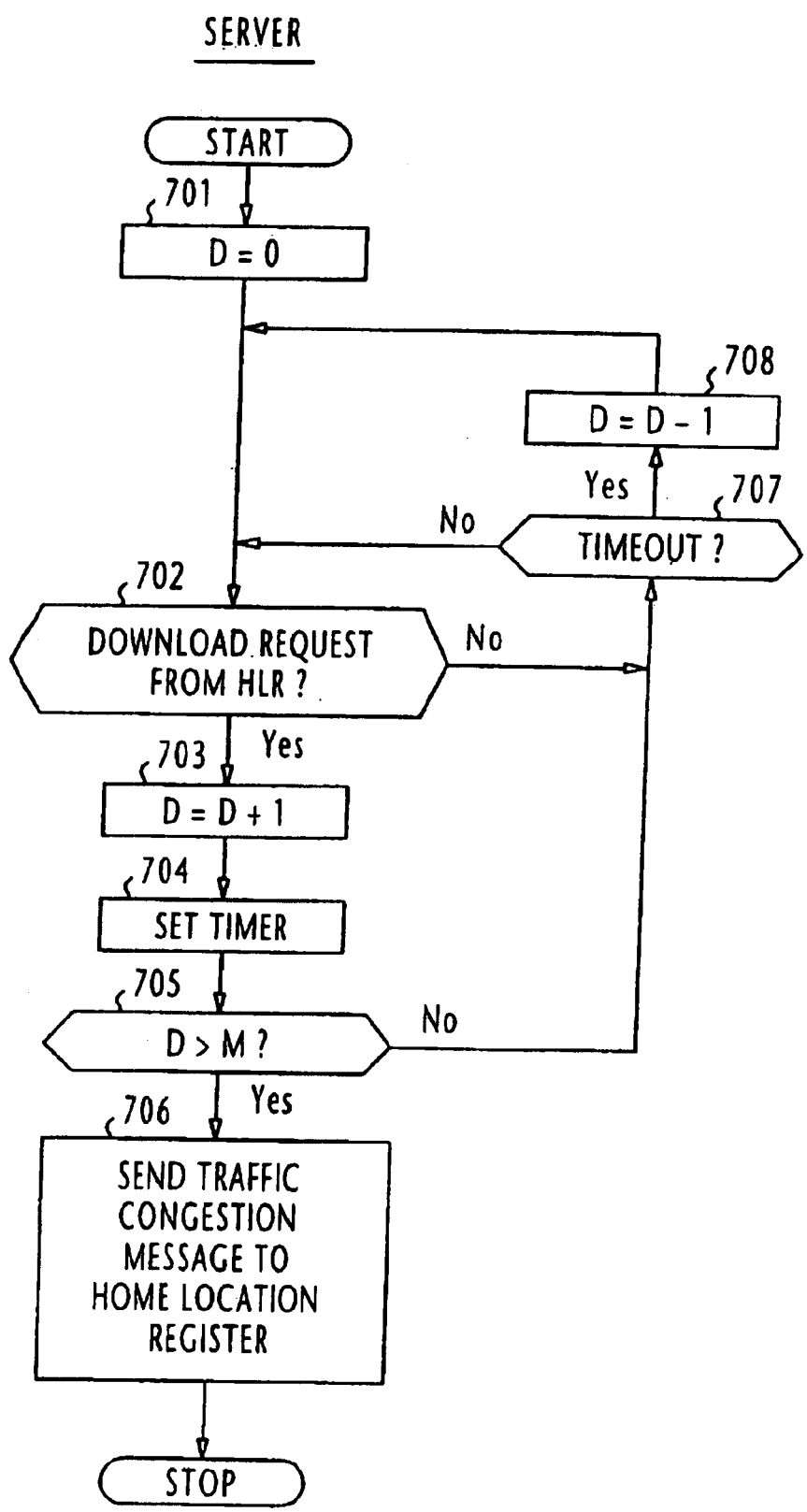
FIG. 14 is a flowchart for operating the server for controlling the network traffic when the network is likely to be overloaded with updating file transfer.

A further modification of the present invention is shown in FIGS. 14 and 15.

Controller 45 of the server 13 is programmed to perform the routine of FIG. 14. In this routine, the server 13 monitors the download request traffic from the home location register 12 and imposes a restriction control on the file transfer traffic through the network to prevent it from being overloaded. Specifically, the server 13 sets a count variable D to zero (block 701). When a download request is received from the home location register (block 702), the count variable D is incremented by one (block 703) and a timer is set (block 704). Count variable D is then compared to a reference value M (block 705). If D is not greater than M, flow exits to block 707 to check to see if a predetermined period set by the timer has expired. If the timer is not expired, blocks 702 to 705 are repeated. Otherwise, flow proceeds from block 707 to block 708 to decement the count value D by one and returns to block 702. Thus, the count value D represents the traffic rate of download requests which may be received from one or more home location registers. If the count value D is greater than M, the server 13 determines that a traffic congestion has occurred and sends a traffic congestion message to the home location register 12 (block 706).

Home location register 12 operates according to the flowchart of FIG. 15. In this routine, the home location register monitors the location registration request traffic from the network 11 and imposes a restriction control on the traffic of its download requests to the server. In FIG. 15, the home location register 12 sets a count variable R to zero (block 801). When a location registration request is received from the network 11 (block 802), the count variable R is incremented by one (block 803) and a timer is set (block 804). Count variable R is then compared to a reference value N (block 805). If R is not greater than N, flow proceeds from block 805 to block 806 to determine whether a traffic congestion message is received from the server. If not, flow exits to block 808 to check for the expiration of the timer. If the timer is still running, blocks 802 to 806 are repeated. If the timer has expired, the count value R is decremented by one (block 809) and returns to block 802 to continue the counting process. If R is greater than N or a traffic congestion message is received from the server, the home location register proceeds to block 807 to discontinue the transmission of download requests to the server.

In a further modification of the first embodiment of the present invention, the mobile terminal 10 stores a set of data modules and a set of version numbers of the data modules. In response to an event triggered by the user of the mobile terminal a location registration request containing the set of version numbers and a phone number of the mobile terminal. The server 13 stores a set of most recent data modules and version numbers of the most recent data modules. Home location register 12 receives a set of version numbers of the most recent data modules which is transmitted from the server 13 whenever the network manager 14 makes a change in previous data modules. Home location register 12 maintains the received set of version numbers in the memory 35. In response to a location registration request from the mobile terminal, the home location register 12 compares the version numbers contained in the received request to the stored version numbers and requests the server 13 to transmit a copy of the set of most recent data modules and the version numbers of the most recent data modules to the client terminal via the communication network if there is a mismatch between the compared version numbers. The mobile terminal receives the copy of the most recent data modules and the version numbers from the server system and updates the installed set of data modules with the received copy and updates the stored version numbers with the received version numbers.

According to a further modification of the second embodiment of the present invention, the mobile terminal stores a set of data modules and transmits a request message to the home location register 12 via the communication network in response to an event triggered by the user of the mobile terminal, containing a phone number of the mobile terminal. The server 13 stores a set of most recent data modules and version numbers of the most recent data modules. Home location register 12 receives a set of version numbers of the most recent data modules from the server 13 which is transmitted whenever the network manager 14 makes a change in previous data modules. Home location register 12 stores a set of most recent data modules. Additionally, it stores a plurality of version numbers of the most recent data modules in the first memory 35 and maps a plurality of sets of version numbers of data modules of mobile terminal to a plurality of phone numbers of the mobile terminal in the second memory 36. Home location register 12, on receiving a location registration request from the mobile terminal, compares a set of version numbers mapped in the second memory 36 corresponding to the phone number contained in the received request to the set of version numbers of the most recent data modules stored in the first memory 35. If there is a mismatch between the compared version numbers, the home location register 12 requests the server 13 to transmit a copy of the set of most recent data modules to the mobile terminal via the communication network and updates the corresponding set of mapped version numbers in the second memory 36 with the version numbers of the first memory 35. The mobile terminal, on receiving the copy of the most recent data modules from the server, updates the installed set of data modules with the received copy.

Such modifications allows efficient updating of a number of data modules by sending only one location registration request to the network whenever the user triggers an event on the mobile terminal such as power-on state, or an operating state of a start-of-call key and an end-of-call key, even though the user is not intended to do so.

What is claimed is:

1. A method of updating data installed on a client terminal from a server system via a communication network, comprising:

at said client terminal, (a) transmitting a request message to the server system via the communication network in response to an event triggered by a user of said client terminal, said request message containing a phone number of said client terminal, at said server system,
- (b) storing most recent data and storing a version number of the most recent data in a first memory and mapping a plurality of version numbers of said data to a plurality of phone numbers in a second memory;
- (c) receiving the request transmitted from said client terminal and comparing a version number mapped in said second memory corresponding to the phone number contained in the received request to the version number of the most recent data stored in said first memory;
- (d) if there is a mismatch between the compared version numbers, transmitting a copy of said most recent data to said client terminal via the communication network and updating said corresponding mapped version number in said second memory with the version number of the first memory, at said client terminal,
- (e) receiving the copy of the most recent data from the server system and updating the installed data with the received copy.

2. The method of claim 1, wherein the step (b) further comprises, at said server system, receiving new data from a network manager when the network manager makes a change in previous data and storing the new data as said most recent data.

3. A method of updating a set of data modules installed on a client terminal from a server system via a communication network, comprising:

at said client terminal,
- (a) transmitting a request message to the server system via the communication network in response to an event triggered by a user of said client terminal, said request message containing a phone number of said client terminal, at said server system,
- (b) storing a set of most recent data modules, storing a set of version numbers of the most recent data modules in a first memory, and mapping a plurality of sets of version numbers of data modules of mobile terminals to a plurality of phone numbers of said mobile terminals in a second memory;
- (c) receiving the request transmitted from said client terminal and comparing a set of version numbers mapped in said second memory corresponding to the phone number contained in the received request to the set of version numbers of the most recent data modules stored in said first memory;
- (d) if there is a mismatch between the compared version numbers, transmitting a copy of the set of most recent data modules to said client terminal via the communication network and updating the corresponding set of mapped version numbers in said second memory with the version numbers of the first memory, at said client terminal,
- (e) receiving the copy of the most recent data modules from the server system and updating the installed set of data modules with the received copy.

4. A method of updating data installed on a client terminal, comprising:

at said client terminal,
- (a) transmitting a request message to a receiving server via a communication network in response to an event triggered by a user of said client terminal, said request message containing a phone number of said client terminal, at said receiving server,
- (b) storing a version number of most recent data in a first memory and mapping a plurality of version numbers of said data to a plurality of phone numbers in a second memory;
- (c) receiving the request from said client terminal via the communication network and comparing a version number mapped in said third memory corresponding to the phone number contained in the received request to the version number of the most recent data stored in said second memory; and
- (d) if there is a mismatch between the compared version numbers, transmitting a download request message to a sending server and updating said corresponding mapped version number in said second memory with the version number of the first memory, at said sending server,
- (e) storing said most recent data and transmitting a copy of said most recent data to said client terminal via the communication network, and at said client terminal,
- (f) receiving the copy of the most recent data from the sending server and updating the installed data with the received copy.

5. The method of claim 4, wherein the step (e) further comprises, at said sending server, receiving new data from a network manager when the network manager makes a change in previous data and storing the new data as said most recent data.

6. A client-server system comprising:

a client terminal for transmitting a request message to a communication network in response to an event triggered by a user of said client terminal, said request message containing a phone number of said client terminal, a server system for storing most recent data and a version number of the most recent data in a first memory and mapping a plurality of version numbers of said data to a plurality of phone numbers in a second memory, receiving said request from said client terminal via said communication network, comparing a version number mapped in said second memory corresponding to the phone number contained in the received request to the version number of the most recent data stored in said first memory, and transmitting a copy of said most recent data to said client terminal via the communication network and updating said corresponding mapped version number in said second memory with the version number of the first memory if there is a mismatch between the compared version numbers, said client terminal receiving the copy of the most recent data from the server system and updating the installed data with the received copy.

7. A client-server system comprising:

a client terminal for transmitting a request message to communication network in response to an event triggered by a user of said client terminal, said request message containing a phone number of said client terminal; and a server system for storing a set of most recent data modules, storing a set of version numbers of the most recent data modules in a first memory, mapping a plurality of sets of version numbers of data modules of mobile terminals to a plurality of phone numbers of said mobile terminals in a second memory, receiving the request transmitted from said client terminal and comparing a set of version numbers mapped in said second memory corresponding to the phone number contained in the received request to the set of version numbers of the most recent data modules stored in said first memory, and transmitting a copy of the set of most recent data modules to said client terminal via the communication network and updating the corresponding set of mapped version numbers in said second memory with the version numbers of the first memory if there is a mismatch between the compared version numbers, said client terminal receiving the copy of the most recent data modules from the server system and updating data modules installed on the client terminal with the received copy.

8. A client-server system comprising:

a client terminal for transmitting a request message to a communication network in response to an event triggered by a user of said client terminal, said request message containing a phone number of said client terminal;

a receiving server for storing a version number of most recent data in a first memory and mapping a plurality of version numbers of said data to a plurality of phone numbers in a second memory, receiving the request from said client terminal via the communication network and comparing a version number mapped in said third memory corresponding to the phone number contained in the received request to the version number of the most recent data stored in said second memory, and transmitting a download request message to a sending server and updating said corresponding mapped version number in said second memory with the version number of the first memory if there is a mismatch between the compared version numbers, said sending server storing said most recent data and transmitting a copy of said most recent data to said client terminal via the communication network, said client terminal receiving the copy of the most recent data from the sending server and updating the installed data with the received copy.

* * * * *